United States Patent

[11] 3,587,444

| [72] | Inventors | Siegfried Godel<br>Norwalk;<br>Lester F. Miller, Bethel, Conn. |
|---|---|---|
| [21] | Appl. No. | 879,987 |
| [22] | Filed | Nov. 26, 1969 |
| [45] | Patented | June 28, 1971 |
| [73] | Assignee | Sperry Rand Corporation<br>New York, N.Y. |

[54] DRIP TYPE COFFEE MAKER
11 Claims, 6 Drawing Figs.

[52] U.S. Cl............................................... 99/282,
99/306
[51] Int. Cl......................................... A47j 31/00
[50] Field of Search.......................................... 99/300,
306, 304, 307, 281, 282, 283

[56] References Cited
UNITED STATES PATENTS

| 2,143,046 | 1/1939 | Wilcox | 99/306 |
| 2,215,837 | 9/1940 | Pinckney | 99/306 |
| 2,794,106 | 5/1957 | Andres | 99/306 |
| 3,333,527 | 8/1967 | Bender | 99/306 |
| 3,442,199 | 5/1969 | McGrail | 99/306 |

*Primary Examiner*—Robert W. Jenkins
*Attorneys*—Charles R. Miranda and Burtsell J. Kearns ABSTRACT: A coffee maker for brewing drip type coffee comprising a water supply reservoir disposed over a coffee server with a coffee basket arranged therebetween. Means are provided for dividing water received therein sequentially into two volumes with thermoresponsive value means provided for releasing sequentially one volume directly to the coffee server at one preselected temperature and the other volume to the coffee basket at a second preselected temperature for later recombination with the first volume in the coffee server.

PATENTED JUN28 1971

INVENTORS'
Siegfried Codel
BY Lester F. Miller

ATTORNEY.

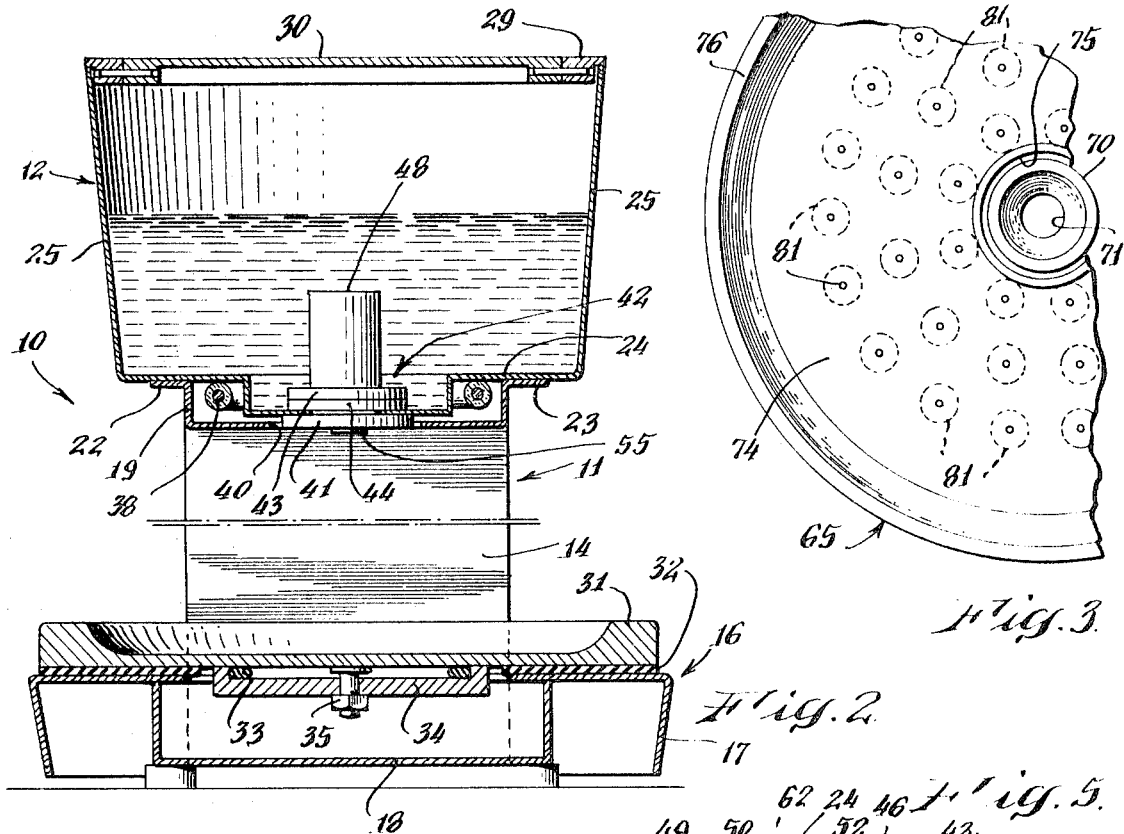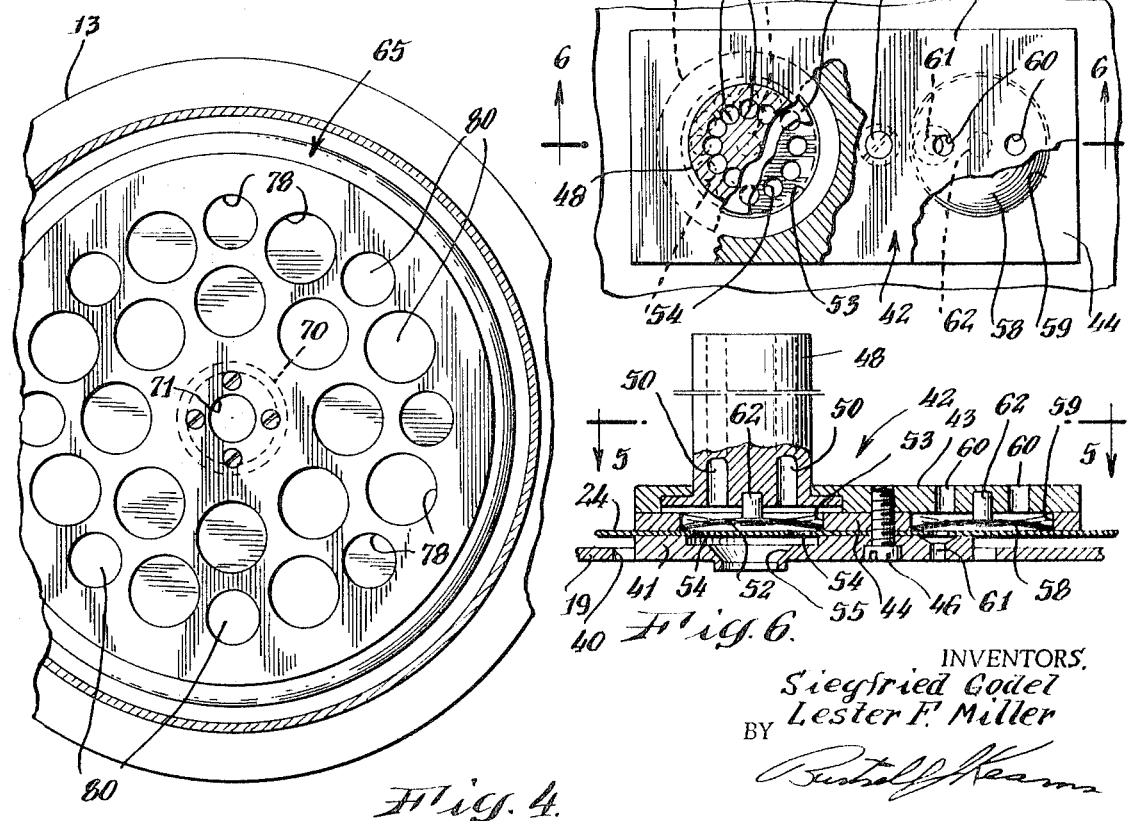

DRIP TYPE COFFEE MAKER

BACKGROUND OF THE INVENTION

This invention is directed to new and useful improvements in coffee makers and more particularly in a coffee maker for brewing coffee in accordance with the drip infusion method.

In known coffee makers of the type used at home for brewing drip grind coffee having a capacity of 3 to 10 cups it is desirable in accordance with established standards, as for example those set by the coffee Brewing Institute (New York City, New York), that the contact time of the heated infusion water with the coffee bed in the coffee basket should be between 4 to 6 minutes with the water at a temperature within the range of approximately 194° F (±9°). The temperature range is desirable in that the extraction does not appreciably change within the range but declines rapidly as temperatures fall below the range.

It is further recommended that 10 grams of coffee be placed in the coffee basket for each cup of coffee desired to be brewed. The mentioned contact extraction or infusion time of heated water with the coffee bed of between 4 to 6 minutes, does not vary appreciably in known devices in accordance with the number of cups of coffee to be brewed. In order that the brewing time might remain constant in accordance with the varying amount of cups to be brewed prior art devices, in lieu of passing all the heated water through the coffee bed, provide means for overflowing portions of the heated water to the coffee server as the heated water is transmitted to the coffee bed. Although satisfactory use has been made of these devices, problems are encountered in controlling the volume of water that flows through the coffee bed over the full range of cups of coffee that might be brewed in these devices. Further the temperature of the water infused with the bed and any portion that might overflow the bed are not appreciably different thereby requiring longer operating times and presenting difficulties in maintaining controlled temperatures of the water during the extraction contact time in the coffee bed.

It is an object of the present invention to provide a novel coffee maker.

Another object of the present invention is to provide a novel automatic coffee maker for brewing drip grind coffee in compliance with desired optimum standards of proper extraction time and concurrently within the optimum range of brewing and serving temperatures.

Another object is to provide novel means for automatically obtaining proper extraction of coffee automatically regardless of the number of cups to be brewed.

SUMMARY OF THE INVENTION

The present invention contemplates a novel coffee maker wherein a supply reservoir is provided with means for sequentially separating the water therein into two predetermined volumes. Means are provided for heating the water of each volume to desired temperatures with thermoresponsive valve means provided for discharging one volume of heated water directly into the coffee server without contacting the coffee bed and for distributing the second volume of water sequentially into the coffee bed, for later recombination with the first volume in the coffee server.

The above and other advantages and objects of the present invention will appear more fully hereinafter from a consideration of the detailed description which follows taken together with the accompanying drawings wherein one embodiment is illustrated.

DESCRIPTION OF THE DRAWINGS

In the drawings:

FIG. 2 is a fragmentary front view of the coffee maker of FIG. 1 with the coffee maker removed therefrom;

FIG. 3 is a partly fragmentary sectional view taken on the line 3-3 of FIG. 1;

FIG. 4 is a partly fragmentary sectional view taken on the line 4-4 of FIG. 1;

FIG. 5 is a plan of the thermoresponsive valve assembly with portions broken away to show the interior structure thereof; and FIG. 6 is a sectional view taken on the line 6-6 of FIG. 5.

DETAILED DESCRIPTION

Figure 1:
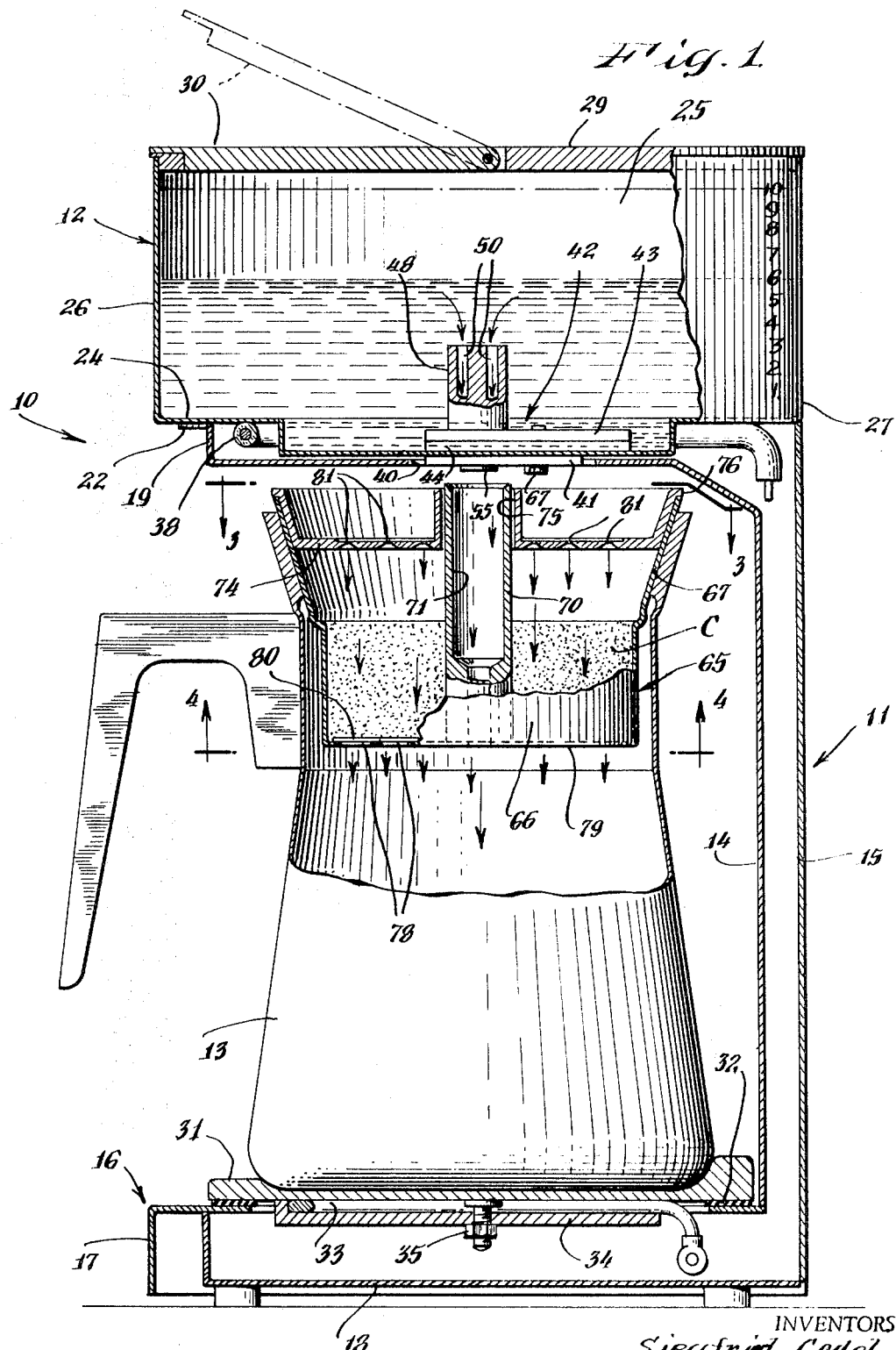
FIG. 1 is an elevational view of a drip-type coffee maker and server incorporating the present invention with parts broken away to show portions of the interior structure thereof.

Referring now to the drawings for a more detailed description of the present invention and more particularly to FIGS. 1 and 2 a novel coffee maker made according thereto is generally indicated by the reference numeral 10. Coffee maker 10 comprises a stand 11 which supports a reservoir tank 12 arranged over a coffee server 13 (FIG. 1).

Stand 11 (FIG. 1) is formed from any suitable material as for example sheet metal and includes an upright rear portion comprised of spaced vertical panels 14 and 15 respectively. Rear panels 14 and 15 are connected to the base portion 16 of stand 11 by spot welding (not shown) the lower portions thereof to the base plates 17 and 18. Stand 11 further includes an upper ledge portion 19 comprising an upper part of vertical rear panel 14 bent away from rear panel 15 at a substantially right angle and projecting over coffee server 13. Ledge portion 19 is provided with spaced side flanges 22 and 23 (FIG. 2) upon which is seated the water reservoir 12.

Reservoir 12 (FIGS. 1 and 2) is of a general box-shaped configuration having a base 24, spaced sidewalls 25 (FIG. 2) and front and rear walls 26 and 27 respectively (FIG. 1). Base 24 is seated on flanges 22 and 23 of ledge portion 19 and is secured thereto in any suitable manner such as by spot welding (not shown). A removable cover 29 is seated on the top of reservoir 12 and is provided with a hinged lid portion 30 shown in partially open position in FIG. 2. In fully open position of lid 30 or with cover 29 removed from reservoir 12 the latter may be filled with water to a desired level in accordance with the number of cups of coffee to be brewed and which levels per desired cup are visually indicated by the numbers 1 to 10 on the outer surface of wall 25 (FIG. 1). The standard measure is 6 fluid ounces per cup and reservoir 12 has a total capacity of approximately 10 cups or 60 ounces.

Base portion 16 (FIG. 1) of stand 11 is provided with a support plate 31 which conforms in outer configuration to and upon which is seated the bottom of coffee server 13. A heat insulating gasket 32 (partially shown in FIGS. 1 and 2) spaces support plate 31 from base plate 17.

A heating element 33 of a usual type such as that sold under the name Calrod is disposed between plates 16 and 17 and is maintained in position against plate 17 by bracket 34 and fastener 35. Heating element 33 is controlled by suitable known thermostat means (not shown) and maintains the contents of server 13 at a desired keep-warm temperature after the coffee has been brewed and deposited therein. A second thermostatically controlled Calrod-type heating element 38 is provided at ledge portion 19 beneath reservoir 12 for heating the contents of reservoir 12 to a predetermined temperature as selected in a manner to be hereinafter further described.

Means are provided in reservoir 12 to sequentially release the water therein to the coffee server 13 on support plate 31. To this end ledge portion 19 (FIGS. 1, 2 and 5) of stand 11 is provided with an opening 44 in which is disposed a rectangular-shaped bottom plate 41 of a thermoresponsive valve assembly generally indicated by the reference numeral 42. Assembly 42 further includes a cover plate 43 and an intermediate valve positioning plate 44. Plates 43 and 44 are disposed on base 24 of reservoir 12. Bottom plate 41 is positioned against the outer under surface of base 24. A fastening screw 46 (FIG. 6) is threaded through plates 41, 43 and 44 of valve assembly and maintains the same in assembled position on base plate 24.

Valve assembly 42 further includes an upright discharge tube member 48 within reservoir 12 having a lower rim portion 49 (FIG. 6) positioned on intermediate plate 44. A plurality of vertical bore holes 50 are formed in tube member 48 which are open at one end to the interior of reservoir 12 and at the opposite end are disposed over a first bimetallic valve member 52 arranged within a circular opening 53 and intermediate plate 44. Normally closed bimetallic valve 52 is positioned over opening 54 in base plate 24 in alignment with a funnel-shaped opening 55 (FIGS. 1 and 6) in bottom plate 41 of assembly 42. A second bimetallic valve 58 is provided in an opening 59 in intermediate plate 44 beneath opening 60 in cover plate 43. Normally closed bimetallic valve 58 in closed position prevents discharge of water through opening 61 in base plate 41. Each valve 52—58 is provided with a positioning stud 62 maintaining the bimetallic discs in position in a usual manner.

As will be apparent both valves 52 and 58 prevent water in reservoir 12 from discharging through openings 55 and 61 respectively until actuated to an open condition as indicated by the broken lines in FIG. 6. Bimetallic valves 52 and 58 each comprise disc members in unactuated condition positioned by stub 61 in over openings 55 and 61 respectively. Thermostatic valve 52 is selected to actuate to an open condition as indicated by the said broken lines in FIG. 6 when the water temperature in reservoir 12 is heated to a temperature of approximately 1700° F. by the heating element 38. Thermostatic valve 58 is selected to actuate to an open condition in a similar manner when the water in reservoir 12 has reached approximately 205° F.

As seen in FIG. 1 coffee server 13 is provided with a coffee grind infusion basket 65. Coffee basket 65 comprises a base portion 66 and an upper conical-shaped portion 67 having tapering sidewalls conforming to the upper portion of server 13 whereby the basket 65 is slidably seated in set position in coffee server 13 in a usual manner with conical-shaped portion engaging the corresponding surface of the server. Basket 65 is provided with a centrally disposed tube 70 having a through bore 71 having an opening in alignment with the funnel-shaped opening 55 in reservoir 12 when server 13 is seated on support plate 31. The opposite end of bore 71 is open to the interior of server 13 beneath basket 65.

A water spreader and distribution lid 74 is provided in basket 65 having an opening 75 to position spreader 74 over center tube 70. Spreader 74 is provided with a peripheral upper lip portion 76 engaging the upper peripheral edge of basket 65 to maintain spreader 74 in position on basket 65.

A plurality of openings 78 (FIGS. 1 and 4) are provided in the base 70 of coffee basket 65 and over which holes is provided a filter member 80 in a usual manner. Spreader 74 is provided with a plurality of openings 81 in the surface thereof whereby water transmitted from the reservoir 12 is fed to the coffee grinds (designated C in FIG. 1) in basket 65 for infusion therewith and subsequent transmittal through filter 80 and openings 78 to the coffee server 13.

In accordance with the above described arrangement let it be assumed that a person desires to utilize coffee maker 10 and prepare for example, 6 cups of coffee. Under these conditions the reservoir 12 is filled with water to the level indicated at the numeral 6 on sidewall 25 of the tank as illustrated in FIG. 1. Basket 65 is then removed and the lower portion 66 thereof filled with 6 measured spoonfuls of 10 grams each of drip ground coffee. The spreader 74 is then placed on basket 65 which is then positioned in coffee server 13 as seen in FIG. 1. Coffee maker 10 is then connected to a suitable electric outlet by an appliance cord (not shown) and heating element 38 is actuated by through suitable conventional thermostatically controlled electric circuitry to heat the water in reservoir 10.

When the water in reservoir 12 reaches a temperature of 170° F bimetallic valve 52 is actuated to the open condition as shown in broken lines in FIG. 6. As valve 52 opens the water in reservoir 12 above the top level of discharge tube 48 flows through bore holes 50 to funnel opening 55 in valve assembly 42 outwardly thereof to the aligned tube 70 in coffee basket 75

65. As indicated by arrows in FIG. 1 the water passing through aligned tubes 48 and 70 flows from bore 21 of the tube 70 to the coffee server 13. In this manner a first volume of heated water consisting of 3 cups is delivered to the server.

When the second or remaining volume of water in reservoir tank 12 is heated to a temperature of approximately 205° F. the second bimetallic valve 58 is actuated to an open condition (broken lines in FIG. 6). The second volume of heated water is then permitted to flow through opening 61 (FIG. 6) in valve assembly 42 to discharge on the spreader 74 on coffee basket 65. The water is distributed by spreader 74 through holes 81 into the coffer bed to commingle with coffee grounds C.

Openings 81 in coffee spreader 74 are of such dimension that the water is distributed to basket 65 for infusion with the coffee bed C and then outwardly through filter 80 and holes 78 at the base of coffee basket 65 to server 13 in 4 to 6 minutes. The infusion water as it extracts the brew from bed C is at a temperature in the optimum range of 194° F. (±9°). The brew extraction water recombines with the first volume of water in server 13 at a temperature of approximately between the ranges of 175° to 185° F. for serving. With server 13 on plate 31 the 1 lower heating element 33 maintains the contents at this optimum serving temperature of 180 (±5°A).

In accordance with the above description it will be apparent that the operation of coffee maker 10 for any number of cups of coffee between 3 and 10 is the same as that above described for 6 cups. The difference in operation being the number of cups of water in reservoir 12 and grams of coffee utilized in basket 65. The first volume of water above tube 48 passing directly to coffee server 13 when valve 52 is actuated at 170° F. and the remaining volume of three cups directed to coffee basket 65 when the second valve is actuated at 205° F. The infusion time of water with the coffee bed C remaining within the optimum 4 to 6 minute contact time and not varying appreciably in the number of cups to be brewed might change.

Under conditions where only 3 cups are to be brewed the operation differs only in that all the water flows to the coffee basket 65 since there is no water above the top of tube 48.

As will be further appreciated the described coffee maker has many advantages in use. Among other advantages optimum water temperatures are achieved in the contact infusion time both when the water is distributed to the coffee server and coffee bed and when recombined within the coffee server. The automatic means for brewing drip type coffee is advantageous in that the device is convenient to use and requires little instruction in use and operation. Further the quality of brewed coffee is maintained uniform at all times in compliance with established standards through the predetermined division of water volumes and novel valve control mechanism 41.

Although one embodiment of the present invention has been illustrated and described in detail it is to be expressly understood that the invention is not limited thereto various changes can be made in the design and arrangement of parts without departing from the spirit and scope of the invention as the same will now be understood by those skilled in the art.

We claim:
1. A coffee maker comprising:
   a. a water supply reservoir;
   b. dividing means in said reservoir for separating water received therein sequentially into first and second volumes;
   c. said reservoir having first and second water outlet means, associated respectively with said first and second volumes of water;
   d. a container;
   e. coffee infusion means disposed between said reservoir and said container;
   f. said second outlet means including means for directing the discharge of water from said reservoir to said container and said first outlet means including means for directing water to said coffee infusion means;
   g. means for heating the water in said reservoir; and h. valve means operable at different predetermined temperatures to sequentially release the second volume of water through said second outlet means to said container and the first volume of water through said first outlet means to said coffee infusion means.

2. The coffee maker of claim 1 wherein said valve means comprises a thermoresponsive bimetallic valve assembly.

3. The coffee maker of claim 2 wherein said bimetallic valve assembly includes a first bimetallic valve within said reservoir associated with said first water outlet means and a second bimetallic valve within said reservoir associated with said second water outlet means.

4. The coffee maker of claim 3 wherein said second bimetallic valve is adapted to be actuated from a normally closed to an open condition when the temperature of said second volume of water falls within the range of 180° F. (±5°) and said first bimetallic valve is adapted to be actuated from a normally closed to an open condition when the temperature of said first volume of water falls within the range of 205° (±5°).

5. The coffee maker of claim 4 wherein said means for dividing water in said reservoir includes a discharge tube said discharge tube open at one end to the interior of said reservoir and at the opposite end to said second bimetallic valve.

6. The coffee maker of claim 5 wherein said first volume of water in said reservoir comprises water received in said reservoir to the level of said opening in said one end of said tube and wherein said second volume comprises water received in said reservoir above said level.

7. The coffee maker of claim 6 wherein said dividing means defines an area within said reservoir for said first volume of water having a capacity of 36 ounces.

8. The device of claim 4 wherein said discharge means associated with said second bimetallic valve and second outlet means comprises a coffee basket in said container, a passageway in said basket in alignment with said discharge tube in said reservoir, said second volume of water passes through said aligned tube and passageway into said container when said first bimetallic valve is operated to open condition.

9. The device of claim 4 wherein said discharge means associated with said first outlet means and first bimetallic valve comprises an opening in said reservoir, said coffee infusion means comprising a coffee basket having a spreader thereon disposed beneath said first outlet means, said first volume of water when discharged through said first outlet means when said first bimetallic valve is actuated to open condition dispersing onto said coffee spreader and through openings in said spreader to a coffee bed in said basket.

10. The coffee maker of claim 3 wherein said discharge means includes a discharge tube associated with said second bimetallic valve, said discharge tube in said reservoir open at one end to the interior of said reservoir and at the other end to said second bimetallic valve, said second bimetallic valve interposed between said discharge tube and said second water outlet means, said discharge means further including an opening in said valve assembly associated with said first bimetallic valve, said first bimetallic valve interposed between said opening and said first outlet means, said coffee infusion means comprising a coffee basket in said container and having a passageway in alignment with said discharge tube extending from said second outlet to said container, a spreader on said basket associated with said first outlet means, said bimetallic valves selected to operate at different predetermined temperatures to discharge sequentially said second volume of water through said aligned tube, second outlet and passageway in said basket to said container, and said first volume of water from said first outlet means to said spreader and through openings in said spreader to the coffee bed in said coffee basket, said coffee basket having opening therein to permit discharge of said infused water of said first volume to the container for recombination with the water of said second volume in said container at predetermined serving temperature.

11. A coffee maker comprising:
a. a stand member having an upper water supply reservoir and a lower supporting plate;
b. a coffee server disposed on said supporting plate beneath said reservoir;
c. a coffee infusion basket arranged in said server and a spreader on said basket having openings in the surface thereof;
d. a vertical passageway in said basket from said spreader to the interior of said server;
e. said reservoir having first and second water outlet means;
f. a vertical discharge tube in said reservoir open at one end to the interior of said reservoir and having the other end mounted on the base of said reservoir in alignment with said second outlet means and said vertical passageway in the coffee basket;
g. means for heating the water in said reservoir;
h. a thermoresponsive valve assembly in said reservoir and operable to release the second volume of water through said discharge tube and second outlet means to said vertical passageway at a first predetermined temperature; and
i. said thermoresponsive means further operable to release said first volume of water sequentially at a second predetermined temperature through said first outlet means to said spreader with said first volume of water passing through said spreader openings to the coffee bed in the basket for recombination in said server with said previously discharged second volume of water.